United States Patent [19]

Giovanni

[11] Patent Number: 5,264,827

[45] Date of Patent: Nov. 23, 1993

[54] VEHICLE TURN SIGNAL REMINDER CIRCUIT

[76] Inventor: Henry P. Giovanni, 1627 Basil Dr., Columbus, Ohio 43227

[21] Appl. No.: 853,808

[22] Filed: Mar. 19, 1992

[51] Int. Cl.[5] .............................................. B60Q 1/40
[52] U.S. Cl. .................................. 340/477; 340/457; 340/475
[58] Field of Search ............... 340/457, 465, 475, 476, 340/477; 302/10.8

[56] References Cited

U.S. PATENT DOCUMENTS

| | | | |
|---|---|---|---|
| 3,240,989 | 3/1966 | Grunwaldt | 340/477 |
| 3,445,810 | 5/1969 | Donohoo | 340/457 |
| 3,806,868 | 4/1974 | Portman . | |
| 3,964,019 | 6/1976 | Wethe et al. . | |
| 4,193,060 | 3/1980 | Slavin et al. . | |
| 4,241,328 | 12/1980 | Lobe et al. . | |
| 4,254,397 | 3/1981 | Shannon | 340/477 |
| 4,565,991 | 1/1986 | Lupoli et al. . | |
| 4,792,785 | 12/1988 | Yukio et al. . | |
| 4,907,844 | 3/1990 | White . | |
| 4,924,208 | 5/1990 | Coughlin . | |
| 4,933,665 | 6/1990 | Bull et al. . | |

Primary Examiner—Brent Swarthout
Attorney, Agent, or Firm—Frank H. Foster

[57] ABSTRACT

A turn signal reminder circuit for warning a vehicle driver that the vehicle turn signals may have been inadvertently left actuated. Turn signal flasher pulses are low pass filtered to provide a continuous enabling signal which initiates the operation of an astable, multivibrator timer circuit. The timer circuit switches asymmetrically between a first occurring longer-time, partial cycle and a shorter-timer, partial cycle. A sound alarm is enabled by the timer during each shorter-time, partial cycle. The alarm is actuated by flasher pulses when the alarm is enabled, but is disabled and the timer circuit is reset in response to operation of the vehicle brake. A pulse detecting circuit for using flasher pulses to turn on the timing circuit has no large capacitor and this permits miniaturization.

8 Claims, 2 Drawing Sheets

VEHICLE TURN SIGNAL REMINDER CIRCUIT

TECHNICAL FIELD

This invention relates generally to vehicle signalling lights and circuitry and more particularly relates to an alarm circuit which warns the vehicle's operator by an audible alarm when the turn signals for the vehicle have been signalling a turn for an unusually long time period, in the absence of actuation of the vehicle's brake, and may therefore be giving an erroneous signal to the other drivers.

BACKGROUND ART

Vehicle turn signals are a valuable safety device because they signal to other vehicles a driver's intention to make a left or right turn. These devices are equipped with mechanical structures which detect when a turn has been completed by sensing the occurrence of a sufficient rotation of the steering wheel which is normal for a completed turn.

On occasion, however, a driver may be observed proceeding down a street or highway with no intention of turning, but with a turn signal flashing. Such erroneous signalling may be both an irritation to other drivers and a safety hazard to drivers who may depend upon the signalling driver's intentions when choosing the path of their own vehicle.

Erroneous signals can arise from a variety of causes. A driver may actuate the turn signals and then change his or her mind without remembering to deactuate the turn signal. On some occasions, a turn is of such a small angle that the signal's turn sensing mechanisms do not deactuate the signalling device. False signalling also commonly occurs by safety conscious drivers who signal lane changes on a highway, but forget to deactuate their turn signal when they return to their desired lane.

A variety of circuits have been proposed to provide an alarm signal to warn a driver that a turn signal may have been inadvertently left actuated. Such circuits are, for example, found in the following U.S. Pat. Nos.: 3,445,810; 3,806,868; 3,964,019; 4,241,328; 4,792,785; 4,907,844; 4,924,208; and 4,933,665.

Despite the existence of these proposals, turn signal reminder circuits have not been accepted either as retrofit, after-market equipment or as original equipment. The reasons for this may include that some of the alarms have circuitries which are too complicated, have too many parts, and therefore are both too expensive and physically too large for inclusion in the conventional flasher can or for easy connection to existing vehicle signalling circuitry. Additionally, some of the alarms may be too obtrusive and therefore irritating to the vehicle operator.

It is therefore an object and feature of the present invention to provide a turn signal reminder circuit which may be installed to a conventional flasher can connector with a minimum of additional connection required to other circuitry and which is sufficiently simple, small and inexpensive that its inclusion either in new vehicles or its addition to existing vehicles is convenient and practical.

Another object and feature of the present invention is to provide a turn signal reminder circuit which sounds its alarm in synchronism with the existing flasher and does so only during relatively shorter time intervals, separated by relatively longer time intervals so as to provide a sufficient, but not annoying alarm to the vehicle's operator.

BRIEF DISCLOSURE OF INVENTION

In the present invention the timing function is accomplished by an astable, multivibrator timer circuit which operates asymmetrically to switch between a longer time, partial cycle and a shorter-time, partial cycle. The timer is enabled by a continuous enabling signal which is derived by converting the flasher pulses to the continuous enabling signal. An audible alarm is enabled during each shorter time portion of the timer cycle and while enabled, is actuated by the flasher pulses. The alarm is disabled and the timer is reset upon operation of the vehicle brake or returning the turn signal switch to neutral. The circuit may be miniaturized to occupy a small area so that it may be easily added to a conventional flasher by utilizing a pulse detecting circuit which has no large capacitor. In particular, the turn signal reminder circuit of the present invention has a pulse detecting circuit for converting pulses to a continuous DC signal for purposes of turning on the timing circuit means. This pulse detecting circuit has a first transistor switch with its input connected to the source of flasher pulses. A low pass, RC filter has its input connected to the output of the first transistor switch. A second transistor switch has its input connected to the output of the low pass filter and its output connected to the electronic timing device to enable and disable it.

Figure 1:
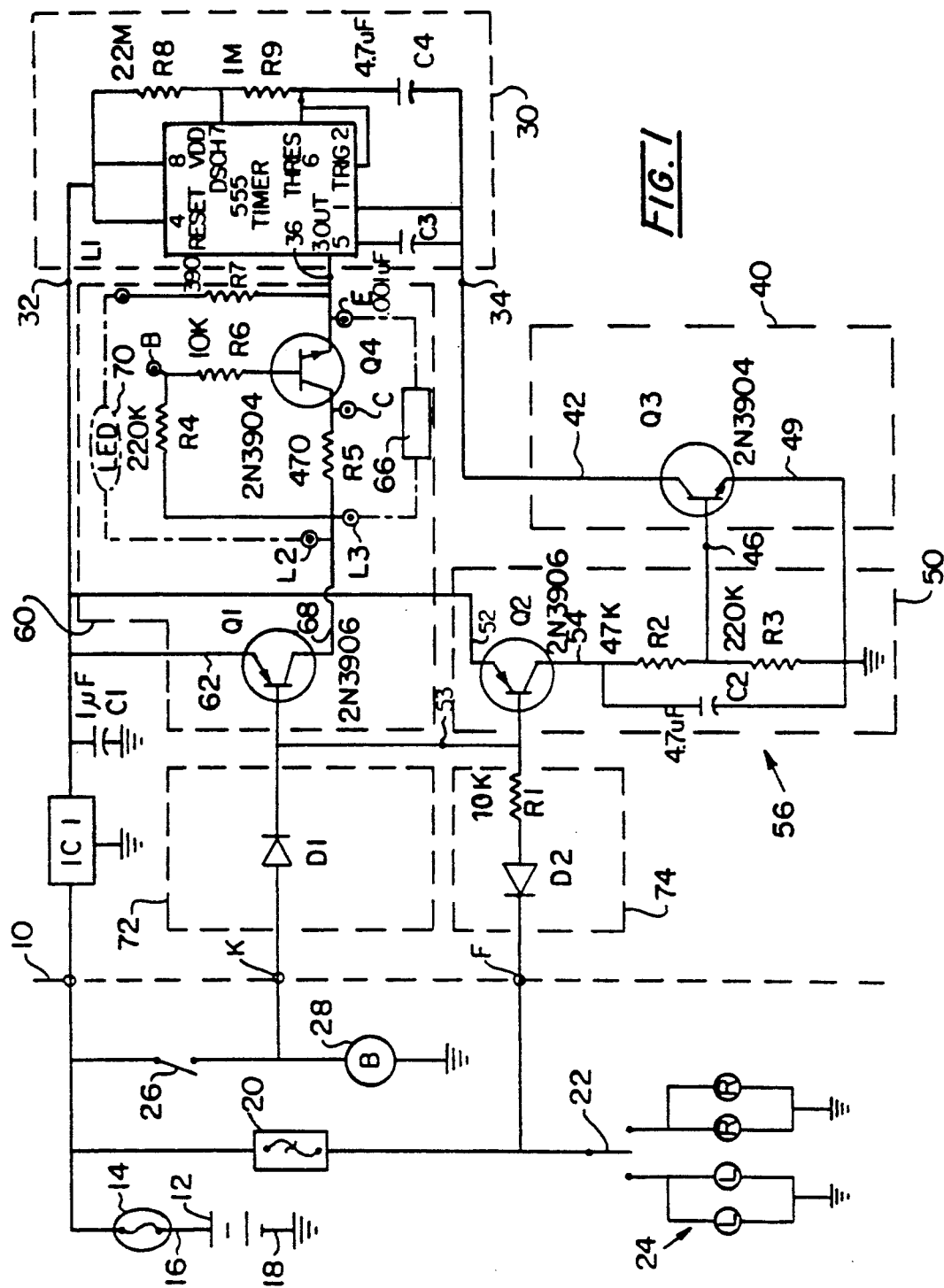
FIG. 1 is a schematic diagram illustrating the preferred embodiment of the invention.

In describing the preferred embodiment of the invention which is illustrated in the drawings, specific terminology will be resorted to for the sake o clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

FIG. 1 illustrates the preferred embodiment of the invention connected to the signalling circuit of a vehicle. The vehicle signalling circuit is illustrated to the left of the vertical, dashed line 10 in FIG. 1 and the circuit of the present invention is illustrated to the right of the vertical dashed line 10.

The vehicle signalling circuit includes an electrical power source 12, such as a conventional twelve volt car battery, which is protected by a series connected fuse 14 connected to its positive, non-grounded terminal 16. The negative terminal 18 of the power source 12 is grounded to the vehicle body in the conventional manner. A flasher switch 20, such as a conventional, bimetallic strip type of flasher switch, a conventional double throw left and right turn signal switch 22 and conventional left and right turn signal lights 24 are all serially connected to the power source 12 through the fuse 14. A conventional brake light switch 26 and conventional brake lights 28 are also serially connected to the power source 12.

The turn signal reminder circuit of the present invention comprises six circuits which are enclosed in dashed-line boxes. These component circuits and their connection to each other, are described in turn. The circuit is also provided with a conventional regulator circuit IC1 and ripple filtering capacitor C1, both of which operate in a conventional manner so that spikes and ripple can be removed and are not present in the power source voltage as applied to the elements of the present invention. Since these are very conventional and would be understood by those skilled in the art, they are not described in detail.

The timing functions of the turn signal reminder circuit are performed by an astable, multivibrator timer circuit 30, which itself is of a conventional prior art design. The timer circuit 30 includes IC2, a 555 timer integrated circuit. Its timing is controlled by a resistor R8, a resistor R9, and a capacitor C4, connected between pins 1, 2, 6, 7, and 8, as illustrated. Because this timer circuit is illustrated in published handbooks, the circuit and its operation is not described in detail. However, its resulting operation is described with the description of the operation of the preferred embodiment below.

In the configuration illustrated, the timer circuit operates as a relaxation oscillator and has a first power supply terminal 32 which is connected to the non-grounded, positive terminal of the power source 12. It also has a second power supply terminal 34 designed for connection to ground. When the timer circuit 30 is enabled, it oscillates asymmetrically to provide, at its output terminal 36, a rectangular waveform, switching between a voltage level near the voltage of the positive power source during a first occurring, larger-time, partial cycle, and a voltage level near the ground potential during a subsequently occurring, shorter-time, partial cycle.

An electrically controlled switch means 40 enables and disables the operation of the timer circuit 30. The electrically controlled switch means 40 comprises a bipolar, NPN transistor Q3, having its collector terminal 42 connected to the second and ground terminal 34 of the timer circuit 30. The emitter terminal 44 of transistor Q3 is connected to the power source ground. The base terminal of transistor Q3 is connected as its control input terminal 46. Consequently, the transistor Q3 operates as an electrically controlled switch with the switch control input terminal 46.

A filtering circuit means 50 is provided for converting voltage pulses from the flasher switch to a continuous output voltage applied to the control input 46 of the electrically controlled switch 40. Thus, the filtering circuit 50 can turn on transistor Q3 and enable the timing circuit 30 to initiate the timing sequence in response to the currents from the flasher pulses.

Filtering circuit 50 has a bipolar, PNP transistor Q2 with its emitter terminal 52 connected to the non-grounded, positive terminal of the power source 12. The base of the transistor Q2 is connected to the base of transistor Q1 and together they form a common input node 53. The collector terminal 54 of the transistor Q2 is connected to the input of an RC low pass filter 56, of space saving design that makes circuit miniaturization possible, and preferably consisting of resistors R2 and R3 and capacitor C2. The output of the low pass filter 56 is connected to the input terminal 46 of transistor Q3.

A sound transducer circuit 60 has a terminal connected to the output terminal 36 of the astable, multivibrator timer circuit 30. The sound transducer circuit 60 has a bipolar, PNP transistor Q1 with its emitter terminal 62 connected to the non-grounded, positive terminal of the power source. The base of the transistor Q1 is connected to the common input node 53.

A sound transducer 66 is connected between the collector terminals 68 of transistor Q1 and output terminal 36 from the timer 30. The transistor Q1 operates as a transistor switch which will actuate the sound transducer 66 when the sound transducer is enabled by the shorter-time, partial cycle of the timer circuit 30.

The sound transducer may be one of several types of sound emitting devices and therefore is illustrated in phantom. It may, for example, be a two-terminal, piezoelectric audio transducer which emits a tone at an 80 dB to 90 dB level and has its own built-in driving circuitry or it may be a three-terminal transducer having a small height with its driving circuitry on the circuit board. Such a transducer is compact and ideal for small spaces. The preferred circuit is provided with soldering donut pads B, E, C, L2 and L3 for connection of alarm signalling elements. For example, a DC two-terminal, piezoelectric audio transducer 66 may be soldered between pads L3 and E. A resistor R7 is provided in the event that a light emitting diode 70 or similar visual alarm is desired. It is connected between pads L1 and L2.

In the event that a three-terminal, piezoelectric transducer is desired for emitting the warning sound, it may be connected at soldering pads E, C and B. The resistors R4, R5, and R6 and transistor Q4 are connected together as a conventional driver circuit for at least one type of three-terminal sound transducer. Since this is a conventional transducer drive circuit, it is not described in more detail. Other audio transducers will require different driver circuitry which can alternatively be substituted for the illustrated driver circuit.

The common input node 53 is connected through enabling and disabling circuits to the turn signal and brake light circuits of the vehicle for enabling and initiating actuation of the reminder circuit and for disabling and resetting the circuit in the event the brake is applied or the lever of the turn signal switch is returned to neutral. In particular, a disabling circuit means 72 is connected between the common input node 53 and the node between the brake lights 28 and the brake switch 26. The disabling circuit 72 is preferably a diode D1 which has its cathode connected to the base terminal 64 of transistor Q1 and base terminal of transistor Q2 and its anode connected between the brake switch 26 and the brake lights 28.

An enabling circuit means 74 preferably comprises a series connected resistor R1 and a diode D2 connected between the common input node 53 and the node between the flasher switch 20 and the double-throw switch 22. The diode is polarized in a direction which permits emitter current flow through transistors Q1 and Q2. Diode D2 operates to block positive pulse levels from the pulsating flasher, while allowing ground, pulse levels to switch on transistors Q1 and Q2.

The operation of the preferred embodiment illustrated in FIG. 1 may be described in connection with both FIG. 1 and the oscillograms of FIGS. 2-5.

Prior to actuation of the double-throw, turn signal switch 22, the flasher switch 20 is relaxed and closed, transistors Q1, Q2, and Q3 are all in non-conducting states and the 555 timer circuit 30 is inoperable with the timing capacitor C4 discharged. At any time, such as t0 for example, the operator initiates turn signal operation by switching the double throw switch 22 to either the left or the right turn signal lights 24, the flasher switch 20 will begin opening and closing in the conventional manner to provide pulses, of the type illustrated in FIG. 3, at the node between the flasher switch 20 and the double-throw, turn signal switch 22.

Figure 3:

After initiation of the flasher pulses of FIG. 3, each time the flasher switch opens, a pulse of current will flow through the emitter-base junction of transistor Q1, the emitter-base junction of transistor Q2, diode D2 and the turn signal lights 24 turning on the transistors Q1 and Q2 for the duration of each such ground level pulse. These pulses are smoothed by the low pass filter 56 in the conventional manner by the storage of energy in capacitor C2, so that the voltage level at the base terminal of transistor Q3 rises to also turn on transistor Q3 and initiate the operation of the timer circuit 30. In this circuit only about 40μA of current flows in the filter network of C2, R2 and R3. It is this network that makes circuit miniaturization possible, because no large filter capacitors are used. The small voltage drop that occurs at the node between R2 and R causes transistor Q3 to conduct and connects IC2 to the low side of the power supply, enabling it in such a way that it is not affected by the pulsating nature of the flasher.

Figure 5:
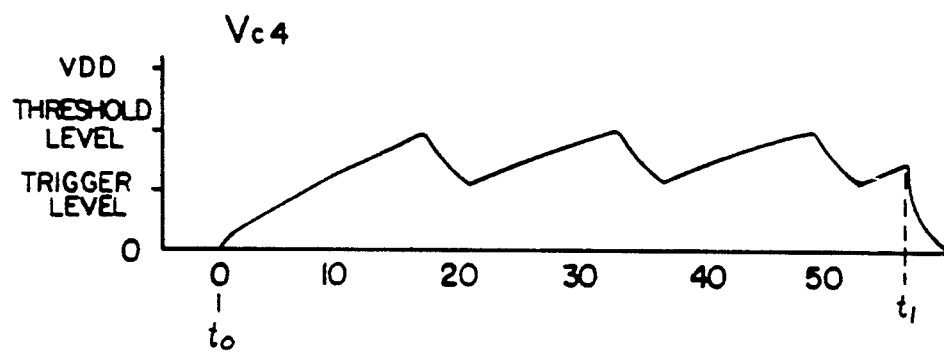

The timing cycle of the timing circuit 30 is illustrated in FIG. 5 by the voltage $V_{c4}$ across the timing capacitor C4. When transistor Q3 turns on, the capacitor C4 begins charging until it reaches the threshold level of the 555 timer at ⅔ charge, approximately 18 seconds after it is enabled by transistor Q3 coming into conduction. During charging of capacitor C4, the voltage $V_3$ at output 36 of the timer circuit 30 is at a potential near the positive potential of the power source 12. Therefore, the sound transducer of the sound transducer circuit 60 is disabled. After this first occurrence of charging C4, the voltage on capacitor C4 reaches the threshold level of the 555 Timer IC2 causing it to switch states. In this new state the voltage on the output 36 of pin 3 switches to near the ground potential and terminal 7 of IC2 switches to near ground potential to discharge capacitor C4. Capacitor C4 discharges for approximately 2 seconds until it falls below the trigger level of IC2. When the voltage on capacitor C4 falls below the trigger level, the 555 timer IC2 again switches state to initiate recharging and a repetition of the cycle. However, during the second and subsequent cycles the longer-time, partial cycle will not be quite as long as the initial 18 second one since capacitor C4 then begins its charging from the higher, trigger level potential rather than from ground potential. For example, the shorter-time, partial cycle may be approximately 13 seconds. Typically the trigger level and the threshold level are at one-third and two-thirds respectively of the voltage of the power supply terminals 32 and 34.

Figure 4:
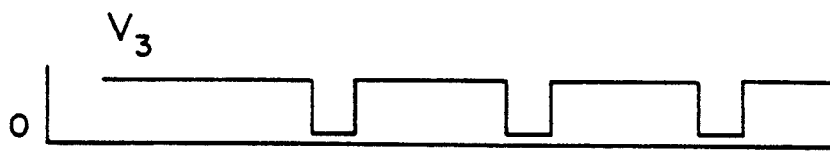

During the shorter-time, approximately 2 second intervals while the capacitor C4 is being discharged, the voltage V3 of output 36 at pin 3 of IC 2 goes to near ground potential, as illustrated in FIG. 4. During this shorter-time interval when the output terminal 36 is near the ground potential, the transducer 66 is enabled. While the transducer 66 is enabled, the flasher pulses which are switching transistor Q1 will cause the transducer 66 to be actuated in synchronism with the flasher pulses each time transistor Q1 is turned on by each flasher pulse going to ground level.

Figure 2:
FIGS. 2, 3, 4, and 5 are oscillograms illustrating the operation of the preferred embodiment of the invention.

From the perspective of the vehicle's operator, who actuates the turn signal at time t0, an initial 18 second interval will occur during which the turn signal is actuated and the signal lights are flashing, but no alarm is sounded by the turn signal reminder circuit. However, after the elapse of the initial 18 second interval, a two second interval will occur, during which time the transducer 66 will be actuated in synchronism with the off flasher pulses to provide sound pulses, as illustrated in FIG. 2. Typically three sound pulses will occur in this two second interval. After this initial alarm sounding, a further silent period of approximately 13 seconds will occur, followed by another two second period of similar alarm sounding. This cycle will repeat until either the turn signal is turned off or the brake switch is activated.

At any time the signal circuit is deactivated, such as at time t1 in FIG. 5, by the vehicle operator or the turn signal system itself returning the double-throw turn signal switch 22 to its central position, base current through transistors Q1 and Q2 will cease and consequently those transistors will turn off. Similarly, if the vehicle operator actuates the brake and thereby closes brake switch 26, at any time while the reminder circuit is in operation, such as, for example, at t1, the base connections of both transistor Q1 and Q2 will be connected through diode D1 to their emitter terminal potential, thus also turning off transistors Q1 and Q2. In either event, with transistors Q1 and Q2 turned off, transistor Q3 will be turned off, thus halting the operation of the timer circuit 30 and permitting C4 to discharge, and additionally preventing current flow through the sound transducer 66.

If it was the actuation of the brake switch 26 which turned off transistors Q1 and Q2, opening of the brake switch 26 will again allow transistors Q1 and Q2 to turn the same sequential events as occurred when the turn switch 22 was first actuated.

It is unnecessary that the first approximately 18 second time period expire before the timer circuit 30 can be reset. If the brake is depressed or the turn signal switch is returned to its central, non-actuated position at any time, timer circuit 30 will reset and will return to its de-energized state without ever sounding the alarm.

The circuit will require only a single lead to the brake light circuit protruding from grounded type, three-prong flashers and only two leads protruding from two-prong flashers, one to ground and one to the brake. The circuit may also be constructed as a stand alone unit easily retrofitted in any existing vehicle by making connections as stated. Compact and complete with transducer retrofitted atop existing flashers extend the height of the flasher can one inch or less made possible, especially because of the small 4.7 μF capacitor used in the filter circuit. The installer has wire connections to make at ground, the load side of the stop light switch and at each flasher terminal. The circuit may also be constructed as a stand alone unit converting any type flasher to a reminder type by making the connections as stated. Alternatively and preferably the turn signal reminder would be manufactured as a composite flasher-reminder unit with no off the flasher external wire connections and built within its own casing with four prongs for direct plug in. Using vehicles would provide matching four terminal receptacle sockets with the necessary leads brought up from ground and from the stop light switch.

While certain preferred embodiments of the present invention have been disclosed in detail, it is to be understood that various modifications may be adopted without departing from the spirit of the invention or scope of the following claims.

I claim:

1. A turn signal reminder circuit for connection to the signalling circuit of a vehicle, the signalling circuit including (1) an electrical power source having two terminals, one of which is grounded to the vehicle body, (2) a flasher switch, a double throw left and right turn signal switch and left and right turn lights serially connected to the power source, and (3) a brake light switch and brake lights serially connected to the power source, the turn signal reminder circuit comprising:

(a) an astable multivibrator timer circuit for generating an asymmetrically switched output at an output terminal and having a pair of power supply terminals, a first one of its power supply terminals adapted for connection to a first terminal of said electrical power source;

(b) an electrically controlled switch having a control input terminal and a pair of switched terminals, one of the switched terminals being connected to the second terminal of the power source and the other switched terminal being connected to the second one of the multivibrator power supply terminals;

(c) a filtering circuit for converting voltage pulses from the flasher switch to a continuous voltage, the filtering circuit having an input and having an output connected to the control input terminal of the electrically controlled switch;

(d) a sound transducer circuit having one terminal connected to the output terminal of the astable multivibrator timer circuit and another terminal connected to the input of the filtering circuit at a common input node;

(e) a disabling circuit connected between the common input node and a node between the brake switch and the brake lights for resetting of the timer circuit upon actuating of the brake; and (f) an enabling circuit connected between the common input node and a node between the flasher switch and the double throw switch for initiating and maintaining operation of the timer circuit.

2. A reminder circuit in accordance with claim 1 wherein
   the first terminal of the electrical power source to which the multivibrator is connected is then on-grounded terminal of the power source, the electrically controlled switch comprises a transistor and the filtering circuit comprises a transistor input stage connected to an RC, low pass filter, output stage.

3. A reminder circuit in accordance with claim 2 wherein the sound transducer circuit includes a sound transducer connected to the output of the astable timer circuit and through a transistor switch having a control input terminal to the non-grounded power source terminal, the transistor switch having its control input terminal connected to said common input node.

4. A reminder circuit in accordance with claim 1 wherein:

(a) the astable multivibrator timer circuit further comprises a relaxation oscillator having its first power supply terminal connected to the non-grounded, positive terminal of the power source and having its output switching between nearer the positive power source potential during a first occurring, larger-time, partial cycle and nearer the ground potential during a subsequently occurring, shorter-time, partial cycle;

(b) the sound transducer circuit further comprises a first, PNP, bipolar transistor having its emitter connected to the non-grounded, positive terminal of the power source and a sound transducer connected between the collector of said first transistor and said output of said astable multivibrator;

(c) the filtering circuit further comprises a second, bipolar, PNP transistor having its emitter connected to the non-grounded, positive terminal of the power source, its base connected to the common input node, and the collector of the second transistor connected to a input of the RC low pass filter stage, an output of the low pass filter being connected to a control input terminal of said electrically controlled switch; and (d) the electrically controlled switch further comprises a third, bipolar, NPN transistor having its collector connected to the second and ground terminal of the timer circuit, its emitter connected to the power source ground, and its base as its control input terminal.

5. A reminder circuit in accordance with claim 4 wherein said disabling circuit comprises a diode having its cathode connected to said common input node and its anode connected between said brake lights and said brake switch and wherein said enable circuit comprises a series connected resistor and a diode polarized to permit emitter current flow.

6. A method for warning a vehicle driver that the vehicle's turn signals may have been inadvertently left activated, the method comprising:

(a) moving a signal switch from a neutral to a signalling position to initiate turn signalling;

(b) converting electrical signal light flasher pulses to a continuous enabling signal;

(c) effecting the astable switching of a multivibrator timer between a first occurring longer-time, partial cycle and a shorter-time, partial cycle, in response to said continuous enabling signal;

(d) enabling an alarm during each said shorter-time, partial cycle; and (e) actuating the alarm by the flasher pulses when the alarm is enabled; and (f) disabling the alarm and resetting the timer in the event of operation of a vehicle brake or the return of the signal switch to the neutral position.

7. A method in accordance with claim 6 wherein said longer time is approximately within the range of 10 seconds and 20 seconds.

8. A method in accordance with claim 6 wherein said shorter time is approximately in the range of 2-3 seconds.

* * * * *